United States Patent
Rowe

(10) Patent No.: US 10,729,146 B2
(45) Date of Patent: Aug. 4, 2020

(54) BUN PRESS AND SLOPPILESS BUN

(71) Applicant: James Henry Rowe, Carol Stream, IL (US)

(72) Inventor: James Henry Rowe, Carol Stream, IL (US)

( * ) Notice: Subject to any disclaimer, the term of this patent is extended or adjusted under 35 U.S.C. 154(b) by 0 days.

(21) Appl. No.: 15/294,682

(22) Filed: Oct. 15, 2016

(65) Prior Publication Data
US 2018/0103651 A1   Apr. 19, 2018

(51) Int. Cl.
| | | |
|---|---|---|
| *A21D 13/32* | (2017.01) | |
| *A21D 13/40* | (2017.01) | |
| *A21C 15/02* | (2006.01) | |
| *A21C 15/00* | (2006.01) | |

(52) U.S. Cl.
CPC ............ *A21D 13/32* (2017.01); *A21C 15/007* (2013.01); *A21C 15/02* (2013.01); *A21D 13/40* (2017.01)

(58) Field of Classification Search
CPC .......... A22C 7/00; A22C 7/0076; A21C 9/068
USPC ........................................................ 425/318
See application file for complete search history.

(56) References Cited

U.S. PATENT DOCUMENTS

| | | | | |
|---|---|---|---|---|
| D586,628 S | * | 2/2009 | Bevers | D7/672 |
| D680,389 S | * | 4/2013 | Zemel | D7/672 |
| 8,616,122 B2 | * | 12/2013 | Smallegan | A21C 9/068 99/352 |
| 2011/0111104 A1 | * | 5/2011 | Thompson | A47J 43/20 425/412 |
| 2014/0065277 A1 | * | 3/2014 | Micara-Sartori | A22C 7/0076 426/513 |
| 2014/0220170 A1 | * | 8/2014 | Bourbeau | A22C 7/0076 425/318 |

* cited by examiner

*Primary Examiner* — Joseph S Del Sole
*Assistant Examiner* — Thu Khanh T Nguyen
(74) *Attorney, Agent, or Firm* — Charles F. Meroni, Jr.; Meroni & Meroni, P.C.

(57) ABSTRACT

A bun press is disclosed. The invention relates generally to a device for shaping the interior of an already baked, sliced bun and thereby creating a sloppiless bun. The device comprises a die or set of dies that is pressed into the top and bottom halves of a single or a plurality of baked, sliced bun(s) to provide an interior cavity that can contain messy, liquid-like or liquid fillings, e.g. "sloppy joe" fillings, melted cheese, meatballs and tomato sauce and the like.

8 Claims, 2 Drawing Sheets

Hand Press

Side View of Hand Press
Side View of Dual Press Platelet

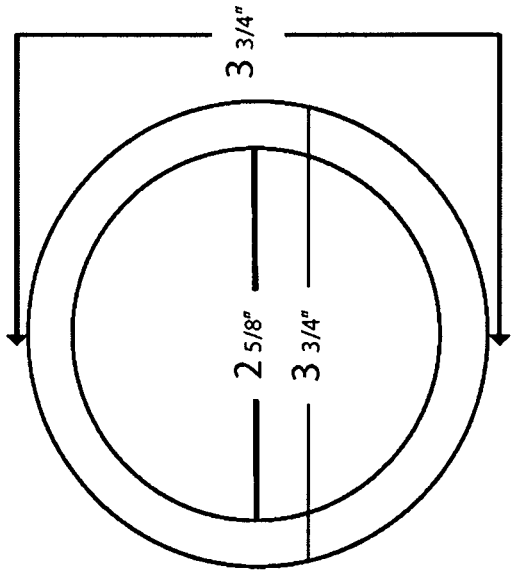
(Fig1A) Top View Of Bottom of Hand Press
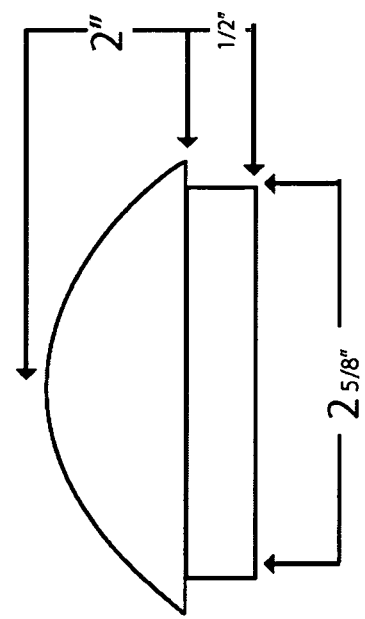
(Fig1B) Side View of Hand Press
Hand Press

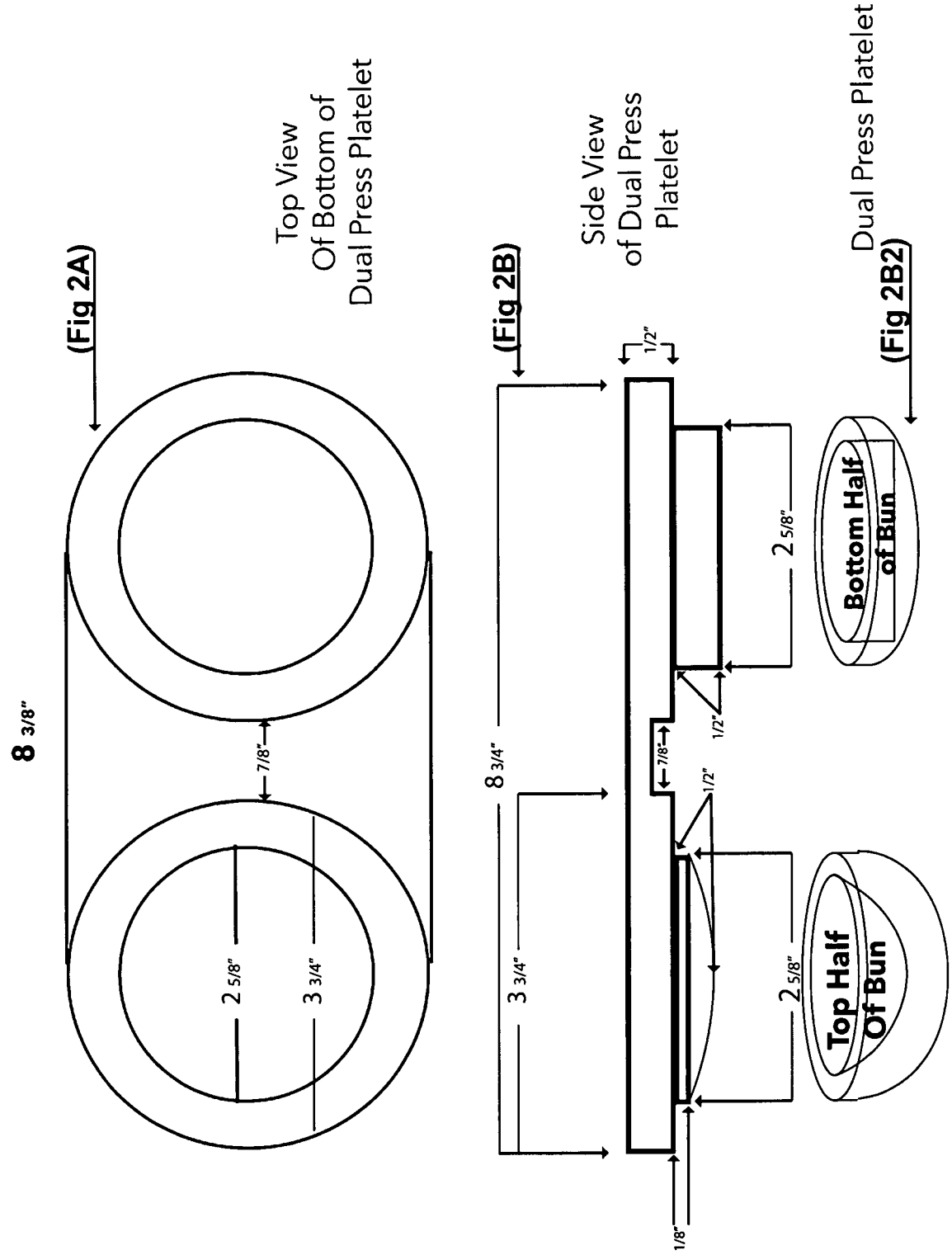

BUN PRESS AND SLOPPILESS BUN

BACKGROUND OF THE BUN PRESS AND SLOPPILESS BUN

There is need for device that can press an indentation or cavity into the interior of a sliced, pre-baked bun or similar already baked bread-based item intended to hold messy, liquid or partially liquid ingredients as a sandwich. The following patents and published applications illustrate the efforts of others to address
the problem of liquid or liquid-like fillings falling or squeezing out of buns or sandwiches during consumption which is solved by the disclosure herein. As can be seen, there are a vast array of efforts already existing to provide a solution to the problems confronted when eating a bun based sandwich filled with liquid or liquid-like fillings, but none provides the combination of features and advantages presented in the instant disclosure.

These references include: U.S. Pat. No. 7,011,850 7,011,859 entitled "Method for Making a Sandwich," issued to Holbrook on Mar. 14, 2006; U.S. Pat. No. 6,231,898 entitled "Sandwich Product and Method for Making Same," issued to Perrine on May 15, 2001; U.S. Pat. No. 4,382,768 entitled "Apparatus for Making Dough Envelopes Containing Filling," issued to Lifshitz et al. on May 10, 1983; U.S. Pat. No. 3,083,651 entitled "Sandwich Making Device," issued to Cooper on Apr. 2, 1963; U.S. Pat. No. 3,068,778 entitled "Sandwich Toaster," issued to Majerus on Dec. 18, 1962; U.S. Design Pat. No. D479,665 entitled "Sandwich Press," issued to Barker on Sep. 16, 2003; U.S. Patent Application Pub. No. 2012/0201927 entitled "Hollow Sandwich Bun Mold and Method of Use," was published on behalf of Meikle on Aug. 9, 2012; U.S. Patent Application Pub. No. 2007/0144359 entitled "Apparatus, System, and Method for Making Sandwiches," was published on behalf of Ekberg et al. on Jun. 28, 2007; and Canadian Patent Application No. 2 611 069 entitled "Apparatus, System, and Method of Making Sandwiches," was published on behalf Ekberg et al. on Jun. 22, 2008 (U.S. equivalent is 2007/0144359).

These references are discussed in greater detail as follows.

U.S. Pat. No. 7,011,850 generally discloses a method of inserting a first foodstuff, such as sandwich fixings, into a second foodstuff, such as a pre-baked bread bun. The method comprises the steps of forming a cavity that extends to the outside in the bread bun, providing a variety of sandwich fixings onto a flexible sheet, rolling the sheet into a sleeve, sliding the sleeve into the cavity and finally withdrawing the sleeve from the bread bun, leaving behind the sandwich fixings. The disclosed method may further comprise drilling the cavity into the pre-baked bread bun.

U.S. Pat. No. 6,231,898 generally discloses a sandwich product that is made by sealing the peripheral portions or edges of two slices or layers of bread together to form a substantially sealed pocket. The pocket contains a filling material. The sealing step takes place without heat. Interior seals may optionally be impressed into the sandwich product to form separate sub-pockets which restrict the flow of ingredients between the sub-pockets. Score lines may be formed in these interior seals so that the product can be separated into pieces.

U.S. Pat. No. 4,382,768 generally discloses an apparatus for making dough envelopes containing a filling (e.g. ravioli). The apparatus comprises a frame having a plurality of inverted cone-shaped chambers. In between each chamber is a cutting ridge having a triangular cross-section. Horizontal pasting faces are provided in the corner of each chamber between the chamber base and the cutting ridge.

U.S. Pat. No. 3,083,651 generally discloses a sandwich pressing device that compresses an assembled sandwich, seals the outer edges of the sandwich to keep the filling ingredients from leaking out and simultaneously with the sealing operation, slices off the peripheral edges. The apparatus has first and second mating elements, each having a shaped recess surrounded by a generally horizontal area. The horizontal area functions to seal the edges of the sandwich. A knife blade is disposed on the outer edges of the horizontal area. The apparatus also comprises a means to move at least one of the mating elements towards the other.

U.S. Pat. No. 3,068,778 generally discloses a sandwich toaster that trims the toasted sandwich into a circular shape while also sealing the edges of the sandwich to keep the sandwich filling ingredients in its interior. The toaster comprises a substantially rectangular base that has a circular cup-shaped depression formed therein. The toaster also has a top section that has a cup-shaped depression formed therein. The base and the top section are connected by a pivot means. Both the base and the top section are provided with heating elements that can toast the exterior of the sandwich. The toaster is also provided with a removable annular cutting ring on the top section to trim excess material from the sealed sandwich.

U.S. Pat. No. 3,068,778 generally discloses a sandwich toaster that trims the toasted sandwich into a circular shape while also sealing the edges of the sandwich to keep the sandwich filling ingredients in its interior. The toaster comprises a substantially rectangular base that has a circular cup-shaped depression formed therein. The toaster also has a top section that has a cup-shaped depression formed therein. The base and the top section are connected by a pivot means. Both the base and the top section are provided with heating elements that can toast the exterior of the sandwich. The toaster is also provided with a removable annular cutting ring on the top section to trim excess material from the sealed sandwich.

U.S. Design Pat. No. D479,665 generally discloses a rectangular sandwich press having various features including among others, a handle, feet on the bottom and a hinge opposite the handle.

U.S. Patent Application Pub. No. 2007/0144359 generally discloses a bladeless sandwich making apparatus that has upper and lower tools. Each of the upper and lower tools has a sandwich receiving cavity that is configured to accommodate sandwich ingredients. The tools are mounted together with a mechanism that functions as a hinge and a handle. The upper tool is configured to engage the lower tool so as to remove sandwich crusts and seal the sandwich edges together, thus sealing in the sandwich filling ingredients. The publication also discloses a method of making crustless sandwiches with sealed edges. The sandwiches may optionally be made with designs impressed onto the sandwich outer surfaces.

U.S. Patent Application Pub. No. 2012/0201927 generally discloses a sandwich bun mold device that creates baked sandwich buns having hollow interior regions. The device comprises a bread mold pan that has a plurality of recesses, a pan cover, and a plurality of inserts of varying size and shape. To make the buns, a user places yeast bread dough in the mold recesses and then selects a desired insert size that will correspond to the size of the desired hollow interior region after the bun has cooked. The insert is then placed on the bread dough and the pan cover is placed onto the pan. A user bakes the assembly until the buns are cooked.

Thus, a problem associated with devices that precede the present disclosure is that they do not provide, in combination with the other features and advantages disclosed herein, a device that can provide a previously baked, sliced bun with an interior cavity designed to contain messy or liquid fillings after the bun is baked.

An additional problem associated with devices that precede the present disclosure is that they do not provide, in combination with the other features and advantages disclosed herein, a device that simultaneously provides a sliced, previously baked bun with an interior cavity and increases the density of the bun in order to lower its permeability to a liquid sandwich filling.

Another problem associated with devices that precede the present disclosure is that they do not provide, in combination with the other features and advantages disclosed herein, a device that can simultaneously provide an interior cavity and toast the interior cavity of a sliced, previously baked bun.

There is a demand, therefore, to overcome the foregoing problems while at the same time providing a bun shaping device that can simultaneously provide an interior cavity to contain fillings, improve the density and optionally toast the inside of a previously baked bun, while being economical to manufacture, easy to clean and durable.

BRIEF SUMMARY OF THE BUN PRESS AND SLOPPILESS BUN

In a preferred embodiment, the bun press disclosed herein provides a bun shaping device that forms a cavity in the interior of a sliced, previously baked sandwich bun.

In another preferred embodiment the bun press can optionally toast the interior cavity of the sliced, previously baked sandwich bun.

Thus, it is an object of the present disclosure is to provide, combination with the other features and advantages disclosed herein, a bun press that creates a sandwich bun having an interior cavity that can contain liquid like or other messy in sandwich fillings and therefore is neater to eat than sandwiches made from unpressed buns.

An additional object of the present disclosure is to provide, in combination with the other features and advantages disclosed herein, a bun press that increases the density of the sliced, previously baked sandwich bun and thus decreases the permeability of the bun to liquid fillings, which also serves to provide neater to eat sandwiches.

The following disclosure provides a bun press that provides the foregoing advantages while at the same time is easy and convenient to operate and clean and further is economical to manufacture.

BRIEF DESCRIPTION OF THE DRAWINGS

In the detailed description that follows, reference will be made to the following figures:

FIG. 1a is a top view perspective of the bottom side of the embodiment of the hand press, shown in FIG. 1

FIG. 1b is a side view perspective of the hand press embodiment shown in FIG. 1

FIG. 2a is a top view perspective of the bottom side of the dual bun press platelet embodiment, shown in FIG. 2

FIG. 2b is the side view perspective of the dual bun press platelet

DETAILED DESCRIPTION

Two bun press embodiments are described hereafter in FIGS. 1 and 2. In a preferred embodiment, the bun press comprises a die or set of dies that are pressed into the sliced faces of a sliced sandwich bun interior to provide the interior of the bun with a one half inch interior cavity on each side of the bun and comprising a total bun shaped cavity of one inch when put together that can contain messy, liquid or liquid-like sandwich fillings that creates a sloppiless bun.

FIG. 1 Shows a side perspective view and a top view of the bottom side of a first embodiment of a hand held bun press to create a cavity on one side of the bun at a time. FIG. 2 Shows a side perspective view and a top view of the bottom side of the first embodiment of a dual press platelet to create a cavity in both the bottom half and top half of a bun at the same time. The press platelet when viewed from a topside view has a stadium shape.

The described embodiments are to be considered in all respects only as illustrative and not restrictive, and the scope of the invention is, therefore, indicated by the appended claims rather than by the foregoing description. Those of skill in the art will recognize changes, substitutions and other modification that will nonetheless come within the scope of the inventions and range of the claims.

I claim:

1. A bun press comprising:
a handle portion being a rounded dome;
a indentation portion connected to the handle portion, the indentation portion being cylindrical in shape and smaller in diameter than the largest diameter of the handle portion; and
wherein the indentation portion is connected to the handle portion are connected in such a way as to form a lip.

2. A press platelet for pressing buns comprising:
a die block;
a first forming tool located on the die block being a curved semicircle attached to a first cylinder, having at its end a curved semicircle forming surface;
a second forming tool located on the die block being a second cylinder, having a flat forming surface.

3. The bun press of claim 1 wherein:
the maximum diameter of the handle portion is 3¾ inches;
the diameter of the indentation portion is 2⅝ inches;
the handle has a height of 2 inches; and
the indentation portion has a height of ½ inches.

4. The press platelet of claim 2 wherein:
the maximum diameter of the first forming tool is 3¾ inches;
the height of the first forming tool's cylinder is ⅛ inches and the total height of the first forming tool is ½ inches;
the diameter of the second forming tool is 2⅝ inches; and
the second forming tool has a height of ½ inches.

5. The press platelet of claim 2 wherein:
the diameter of the first forming tool's cylinder is identical to the diameter of the second forming tool's diameter.

6. The press platelet of claim 2 wherein:
the first forming tool and the second forming tool located on the die block are oriented in the same direction.

7. The press platelet of claim 6 wherein:
the first forming tool and the second forming tool located on the die block are spaced apart.

8. The press platelet of claim 2 wherein:
the press platelet when viewed from a topside view has a stadium shape.

* * * * *